United States Patent Office 2,736,961
Patented Mar. 6, 1956

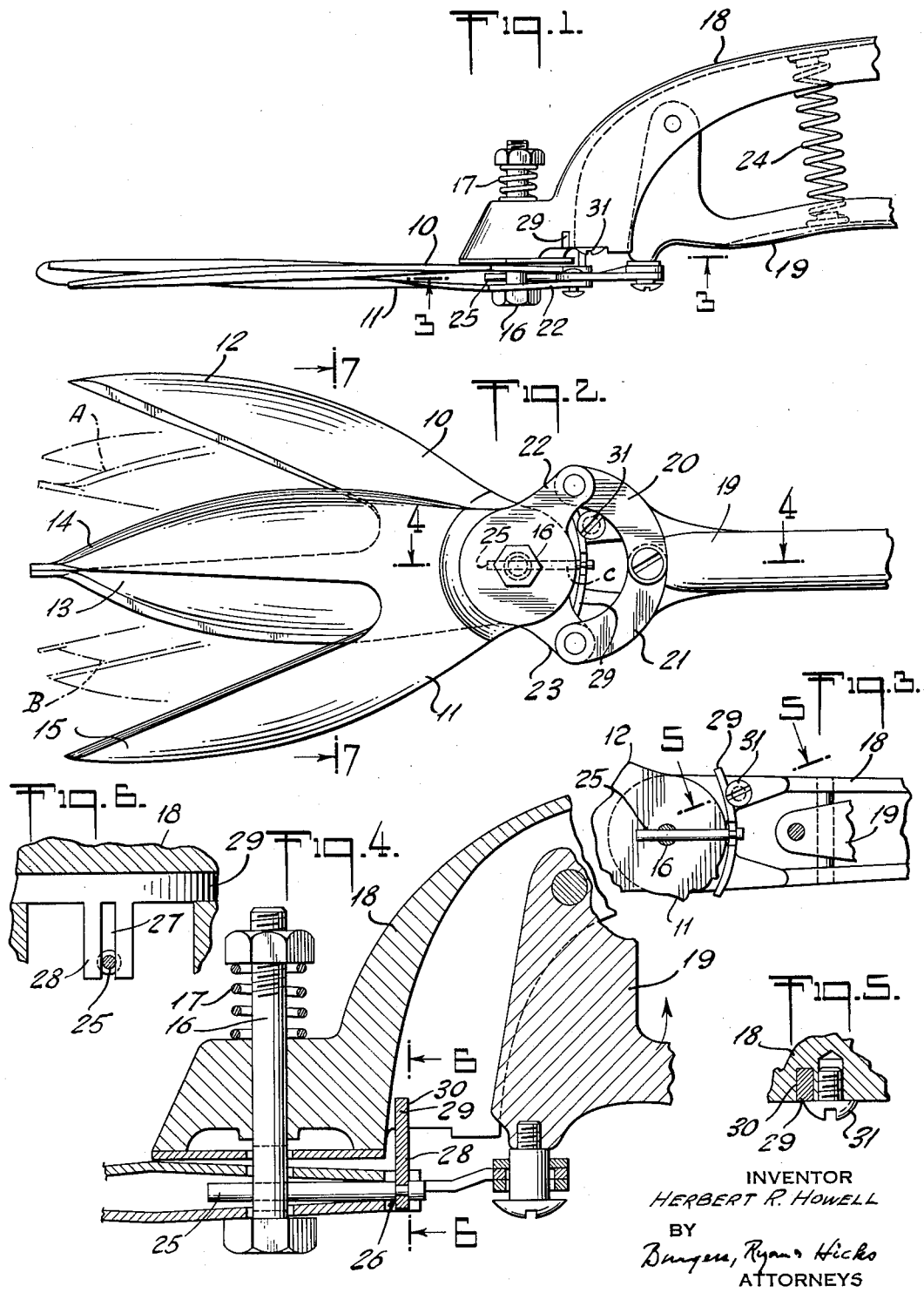

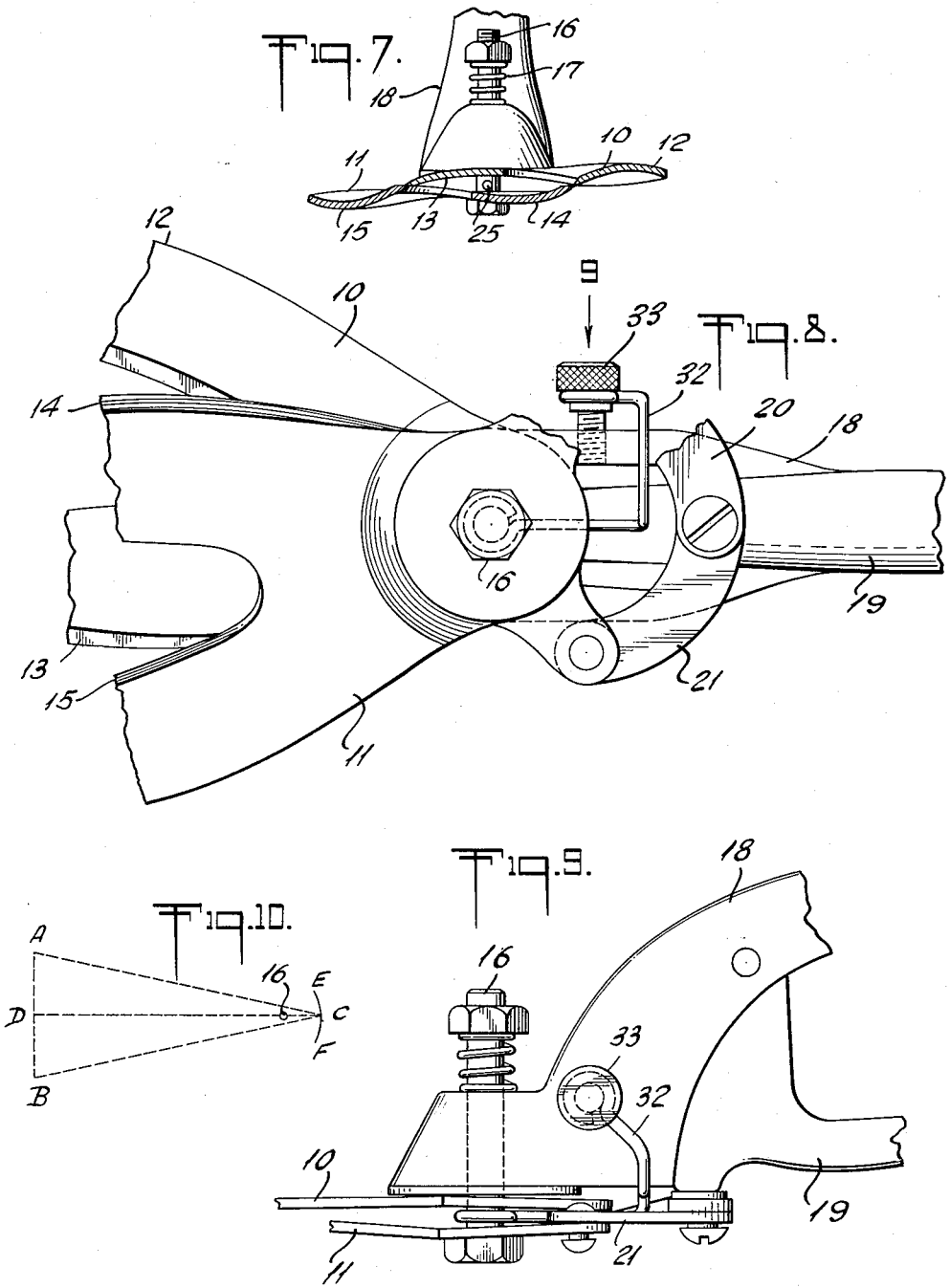

2,736,961

CUTTING SHEAR

Herbert R. Howell, Summit, N. J.

Application March 10, 1955, Serial No. 493,330

9 Claims. (Cl. 30—213)

The present invention relates to a cutting shear and relates, more particularly, to a multiple-bladed cutting shear.

An object of the present invention is to provide a multiple-bladed cutting shear in which the cutting pressure or tension at the points of contact between the opposing sets of blades may be equalized or balanced whereby smooth and easy operation of the shear is obtained.

Another object of the invention is to provide a multiple-bladed cutting shear which has a roller bearing interposed between opposing portions of the cutting members of the shear permitting easier movement of the cutting members relative to each other and reducing excessive wear.

Other objects and advantages of the invention will be apparent and best understood from the following description and the accompanying drawings in which:

Fig. 1 is a side elevational view of a multiple-bladed cutting shear embodying the invention;

Fig. 2 is a bottom plan view of the cutting shear illustrated in Fig. 1;

Fig. 3 is a fragmentary section view taken along the line 3—3 of Fig. 1;

Fig. 4 is a section view taken along the line 4—4 of Fig. 2;

Fig. 5 is a section view taken along the line 5—5 of Fig. 3;

Fig. 6 is a section view taken along the line 6—6 of Fig. 4;

Fig. 7 is a section view taken along the line 7—7 of Fig. 2;

Fig. 8 is a fragmentary plan view from the bottom of a modified cutting shear embodying the invention;

Fig. 9 is a fragmentary side elevational view of the cutting shear illustrated in Fig. 8; and Fig. 10 is a diagrammatic view illustrating the balancing action obtained in a cutting shear embodying the invention.

Referring to the drawings in detail, there is a multiple-bladed cutting shear which has two cutting members 10 and 11 pivotally secured together in opposing relation. Each of the cutting members carries two spaced cutting blades 12, 13, 14, and 15. The cutting blades 12 and 13 on the cutting member 10 engage with the cutting blades 14 and 15, respectively, on the opposing cutting member 11 and the respective sets of cutting blades move across each other when the cutting members are moved relative to each other.

The cutting shear illustrated is particularly designed for the cutting and trimming of grass. However, it will be understood that the present invention is not limited to use in grass-cutting shears, but may be incorporated in other types of shears as well.

The blades 13 and 14 on the respective cutting members have motion checks formed at their outer ends which engage with the blades on the opposing cutting members at the open and closed positions of the blades and thus limit the movement of the cutting members relative to each other. Cutting shears of this type are fully described in my U. S. Letters Patent Nos. 2,566,492 and 2,629,170 issued September 4, 1951, and February 24, 1953, respectively, and hence, need not be described in detail here.

The cutting members are secured together for pivotal movement relative to each other by a bolt 16 which extends through the rear portions of the cutting members. A spring 17 surrounds the bolt 16 and the action of the spring 17 on the bolt urges the cutting members into cutting engagement. A handle 18 is secured to the bolt and extends rearwardly therefrom. An operating member 19 is pivotally mounted on the handle in a position where it can be readily grasped. The operating member is connected by links 20 and 21 to legs 22 and 23, respectively, extending from the rear portions of the respective cutting members. An expansion spring 24 is interposed between the handle and the operating member and normally urges the operating member to a position where the blades on the cutting members are in open position.

In using the shear, the operating member is raised toward the handle against the force of the spring by the pressure of the user's fingers. The movement of the operating member in this direction causes the cutting members to be pivotally moved relative to each other through the linkages 20 and 21. This movement causes the cutting edges on the blades carried by the respective cutting members to be moved across the cutting edges of the blades on the opposing cutting member with a cutting action. The cutting members and the cutting blades are returned to their open position by the action of the spring 24 on the operating member when the finger pressure on the operating member is released.

An adjustable bearing member 25 is interposed between opposing portions of the cutting members behind the bolt 16. Thus, the spring 17 which acts on the cutting members through the bolt holds the blades on the cutting members in cutting engagement at two spaced points, as indicated at A and B, and also holds the cutting members in engagement with the bearing at a point beyond the bolt as indicated at C. The bearing also tilts the cutting members slightly with respect to each other so that the cutting blades cross each other at a slight angle.

Referring to Figs. 1–7, the bearing member 25 is in the form of a hardened steel rod having one end extending through an opening in the bolt. The other end of the rod contains a reduced portion or groove 26 which fits into a slot 27 between spaced legs 28 extending downwardly from an arcuate positioning member 29. The sides of the reduced portion 26 of the rod engage with the legs 28 and the rod is free to rotate. Thus, when the cutting members are moved relative to each other the rod acts as a roller bearing between the cutting members and it also prevents the bolt from rotating and becoming loosened.

The arcuate positioning member 29 from which the legs engaging with the bearing 25 extend, is mounted in an arcuate slot 30 in the bottom of the handle 18 and may be moved relative to the handle. Movement of the positioning member also moves the bearing member relative to the cutting members and permits the bearing member to be positioned at a point between the cutting members where the cutting pressure or tension between the opposing cutting blades at the points A and B will be equal and a uniform cutting action will be obtained between each set of blades. A set screw 31 engages and holds the positioning member in place when the bearing member has been placed in proper position.

When the two cutting members are of the same configuration, as will usually be the case, the point C at which the cutting members engage with the bearing member should be located so that a line drawn from the point C and passing through the bolt bisects the angle made by lines drawn from the points A and B to C. This is diagramatically illustrated in Fig. 10 where the line CD passes through the bolt and bisects the angle between lines AC and BC. Under such conditions, the spring pressure exerted through the bolt will be equally distributed at points A and B and the cutting action between the two sets of blades will be uniform.

If the point C is shifted toward point E, the pressure exerted between the blades contacting at point B will be greater than the pressure exerted between the blades contacting at point A. The reverse is true if the point C is shifted toward the point F.

In addition to providing for equal cutting pressure between the cutting blades, the bearing 25 tends to eliminate binding between the opposing cutting members and insures a smooth cutting action with the least amount of wear. The bearing member requires little, if any, oiling and it spaces the heels of the cutting members sufficiently to provide room for rocking of the cutting members in case of a warped or bent blade.

In the embodiment of the invention illustrated in Figs. 8 and 9, parts previously referred to have been identified by corresponding reference numerals and a description of such parts need not be repeated. In this case, there is a bearing member 32 formed from a steel rod or wire. The bearing member 32 is L-shaped and one end thereof is secured by a loop to the bolt. The other end of the bearing member extends outwardly to one side of the handle and is secured to an adjusting screw 33 which is threaded into the handle. The position of the bearing member relative to the cutting members may thus be adjusted by turning the adjusting screw in an appropriate direction.

It will be understood that various changes and modifications may be made by those skilled in the art in the embodiments of the invention as illustrated and described herein without departing from the scope of the invention as defined by the following claims.

I claim:

1. A cutting shear having a pair of opposing cutting members mounted for pivotal movement relative to each other on a bolt and having portions extending forwardly and rearwardly of the bolt, said cutting members being held in cutting engagement with each other by spring means acting on said members through the bolt which is characterized by a bearing member interposed between opposing portions of the cutting members extending rearwardly of the bolt, and means for adjusting the position of the bearing member relative to the cutting members.

2. A cutting shear as defined in claim 1 wherein the bearing member is rotatably supported between the cutting members.

3. A multiple-bladed cutting shear having a pair of opposing cutting members, said cutting members being pivotally movable relative to each other and being resiliently urged into cutting engagement with each other, each of said cutting members including a pair of spaced cutting blades extending forwardly of the pivot point of the cutting members, the blades on the respective cutting members engaging with the blades on the opposing member at spaced points which is characterized by a bearing member interposed between and engaging with the opposing cutting members at a point behind the pivot point of the cutting members, and means for adjusting the position of the bearing member relative to the cutting members.

4. A multiple-bladed cutting shear as defined in claim 3 wherein the bearing member is rotatably mounted between the opposing cutting members.

5. In a cutting shear having a pair of opposing members pivotally secured together for movement relative to each other, each of said cutting members having a pair of spaced cutting blades extending forwardly of the point at which the cutting members are pivoted with the cutting blades on the respective members engaging at spaced points with the cutting blades on the opposing member, the combination comprising an adjustable bearing member interposed between and engaging with the opposing cutting members behind the point at which the cutting members are pivoted, means for rotatably supporting the bearing member, and means for adjusting the position of the bearing member relative to the cutting members.

6. In a multiple-bladed cutting shear of the type having a pair of opposing cutting members with a pair of spaced cutting blades on each of said members, the combination of a bolt pivotally securing said cutting members in opposing relation with the cutting blades on the cutting members extending forwardly thereof, spring means acting on the cutting members through said bolt and holding the blades on said members in cutting engagement, a bearing member interposed between the opposing cutting members, said bearing member engaging with the cutting members at a point behind the bolt, and means for adjusting the bearing member relative to the cutting members.

7. In a multiple-bladed cutting shear of the type having a pair of opposing cutting members with a pair of spaced cutting blades on each of said members, the combination of a bolt pivotally securing said cutting members in opposing relation with the cutting blades on the cutting members extending forwardly thereof, spring means acting on the cutting members through said bolt and holding the blades on said members in cutting engagement, a round bearing member interposed between the opposing cutting members and engaging with the cutting members at a point behind the bolt, said bearing member having one end extending into an opening in the bolt and being rotatably supported between the cutting members, and adjustable means engaging with the other end of the bearing member for securing the bearing member in a selected position relative to the cutting members.

8. In a multiple-bladed cutting shear of the type having a pair of opposing cutting members with a pair of spaced cutting blades on each of said members, the combination of a bolt pivotally securing said cutting members in opposing relation with the cutting blades on the cutting members extending forwardly thereof, spring means acting on the cutting members through said bolt and holding the blades on said members in cutting engagement, a round bearing member interposed between the opposing cutting members and engaging with the cutting members at a point behind the bolt, said bearing member having one end extending into an opening in the bolt and being rotatably supported between the cutting members, and adjustable means engaging with the other end of the bearing member for securing the bearing member in a selected position relative to the cutting members, said adjustable means including an arcuate member having legs extending therefrom and engaging with one end of the bearing member.

9. In a multiple-bladed cutting shear of the type having a pair of opposing cutting members with a pair of spaced cutting blades on each of said members, the combination of a bolt pivotally securing said cutting members in opposing relation with the cutting blades on the cutting members extending forwardly thereof, spring means acting on the cutting members through said bolt and holding the blades on said members in cutting engagement, a bearing member interposed between the opposing cutting members, said bearing member being L-shaped and having one end secured to the bolt and the other end thereof extending beyond the cutting members and an adjustable member engaging with said other end of the bearing member, whereby the bearing member may be moved relative to the cutting members.

No references cited.